Figure 1:
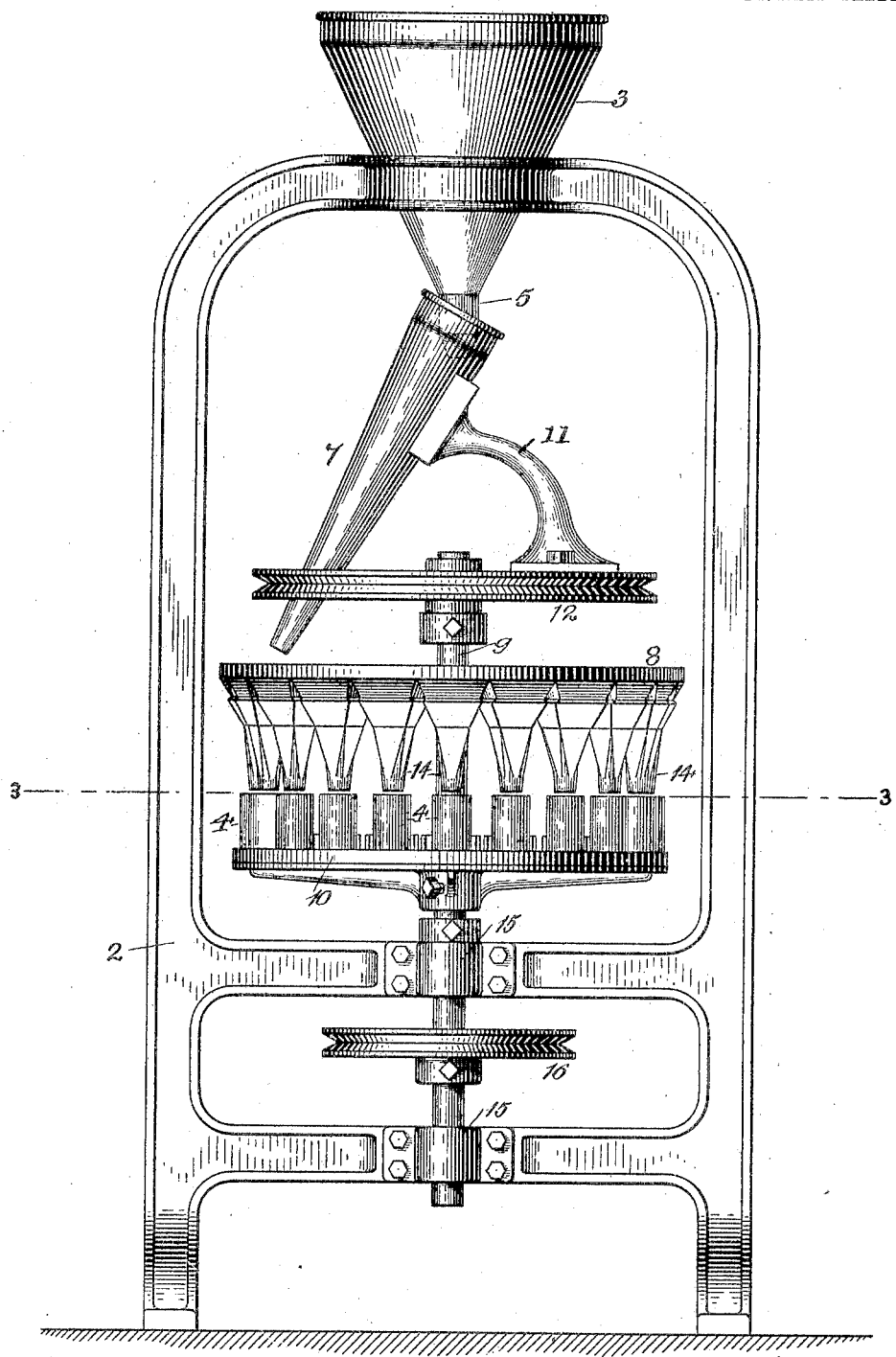

No. 797,144. PATENTED AUG. 15, 1905.
W. E. NICKERSON.
APPARATUS FOR OBTAINING DESIRED QUANTITIES OF MATERIAL.
APPLICATION FILED NOV. 25, 1901.

2 SHEETS—SHEET 1.

WITNESSES:
INVENTOR:
W. E. Nickerson,
by E. D. Chadwick,
Attorney.

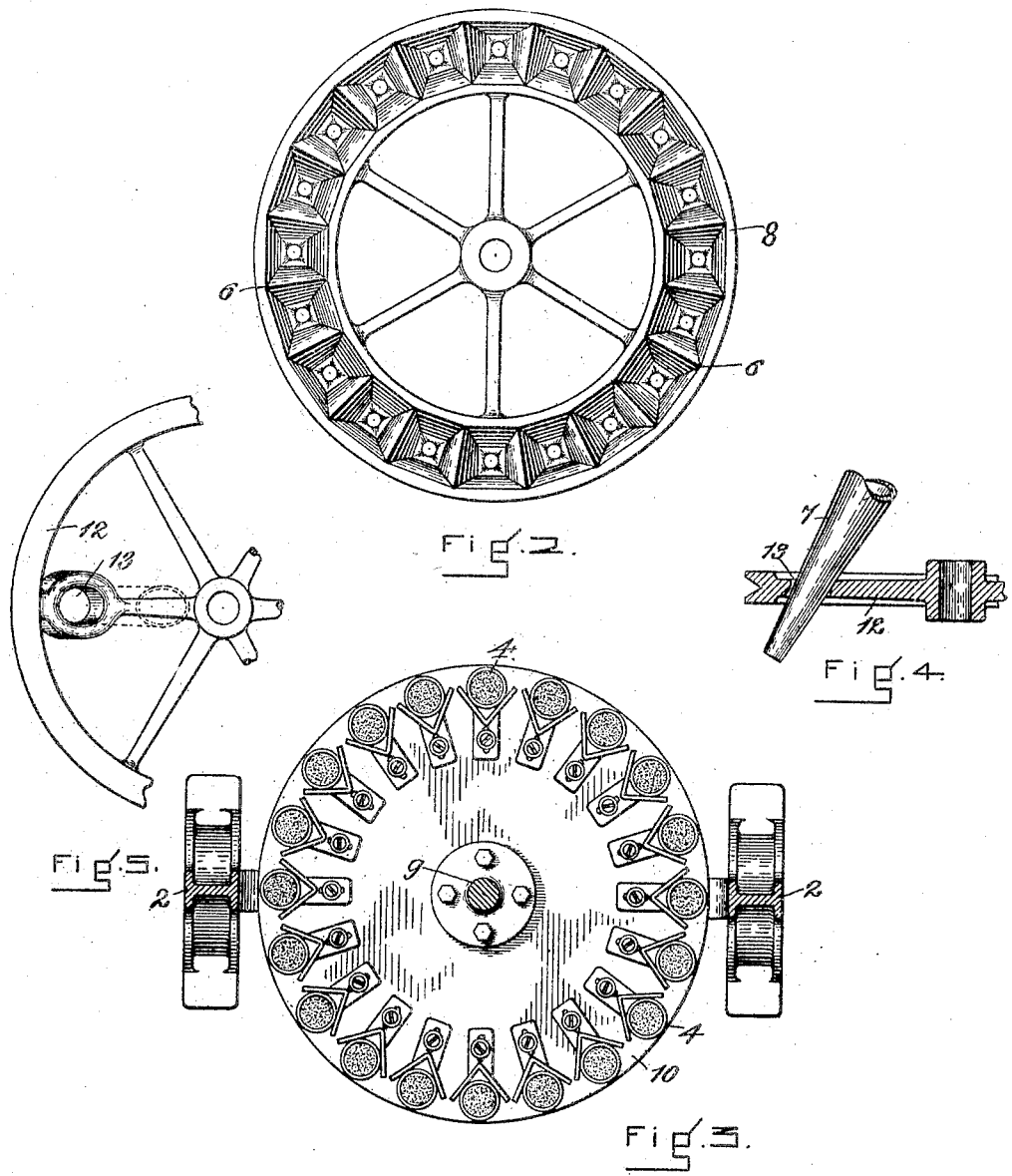

UNITED STATES PATENT OFFICE.

WILLIAM EMERY NICKERSON, OF CAMBRIDGE, MASSACHUSETTS, ASSIGNOR, BY MESNE ASSIGNMENTS, TO AUTOMATIC WEIGHING MACHINE COMPANY, OF NEW YORK, N. Y., A CORPORATION OF NEW YORK.

APPARATUS FOR OBTAINING DESIRED QUANTITIES OF MATERIAL.

No. 797,144.      Specification of Letters Patent.      Patented Aug. 15, 1905.

Application filed November 25, 1901. Serial No. 83,566.

*To all whom it may concern:*

Be it known that I, WILLIAM EMERY NICKERSON, a citizen of the United States, residing at Cambridge, in the county of Middlesex and State of Massachusetts, have invented certain new and useful Improvements in Apparatus for Obtaining Desired Quantities of Material, of which the following is a specification.

My invention relates to the obtaining of desired quantities of material by separating successively from a gross quantity of material a large number of approximately proportional portions and distributing the same among a number of receivers, which portions are so small and so numerous that variations in the proportion between them are distributed among a considerable number of receivers and averaged in each receiver, whereby the desired quantities are built up concurrently at practically the same rate for each receiver. By such operation a gross quantity of material equal in amount to the sum of the desired quantities will evidently be distributed in the desired proportion among the several receivers without making it necessary to perform any weighing or measuring operation except such as may be required to determine the gross quantity of material operated upon.

In the accompanying drawings, Figure 1 is a front elevation of an apparatus embodying my invention. Fig. 2 is a plan view of a wheel-like member the rim of which is divided by a series of separating edges into a number of pockets. Fig. 3 is a horizontal section on the line 3 3 in Fig. 1. Fig. 4 is a detail view, partly in side elevation and partly in vertical section, showing a spout arranged to deliver a stream of material over the separating edges; and Fig. 5 is a plan view of the parts shown in Fig. 4.

In the drawings, 2 represents the supporting-framework of the apparatus, which is designed to support at its top a bin or hopper 3, capable of holding and adapted to receive an accurately-determined quantity of material equal to the aggregate amount desired to be introduced into the packages or other receptacles 4 by one operation of the apparatus. The bin 3 is provided with a spout or other opening 5, adapted to deliver a continuous stream of the material placed in the bin until said material has been entirely exhausted therefrom.

Beneath the bin 3 is located a series of separators preferably consisting of sharp edges 6, which are to be brought under the stream of material successively, as by giving a lateral movement to said stream. In order that the movement of the stream across the separators 6 may be continuous, said separators are arranged in a circle, as shown in Fig. 2, and the stream of material is led to the proper position above them by means such as an inclined spout 7 so arranged that its upper end will always be directly below the opening 5, while its lower end will be capable of movement in a circle over the separators successively, the construction being such that a vertical line drawn through the center of said circle will pass as nearly as possible through the center of the opening 5.

The separators 6 are preferably cast integral with or otherwise secured to a wheel-shaped supporting member 8 and are sharply defined and accurately spaced apart at distances proportionate to the amounts of material desired to be delivered between the pairs of separators, respectively. When the amounts to be delivered by the apparatus are to be equal to one another, as will ordinarily be the case, the separators 6 will be equidistant, measured along the path of the moving stream. The wheel member 8 is suitably supported in a horizontal position by means of a vertical rod 9 and is accurately centered in line with the axis around which the spout 7 is adapted to revolve, and below said wheel member is located a table 10, arranged to carry the receptacles to be filled. To provide for the desired movement of the spout 7, it may be rigidly supported by means of a bracket 11 on a pulley 12 in the position shown, said pulley being mounted loosely upon the upper end of the vertical rod 9 and driven by a belt or otherwise and being provided with an aperture 13, through which the lower end of the spout 7 passes, so that upon the rotation of the pulley 12 the lower end of said spout will be moved in a circle across the separators 6 and directly above the same at a constant distance from the center of the wheel member by which they are carried.

The spaces between the separators 6 form a series of pockets into which successive small portions of material fall and from which they are conducted into a corresponding series of receptacles 4, supported on the horizontal table 10, preferably through suitable funnels 14, attached to the open bottoms of the pockets.

The operation of the parts above described, briefly stated, is as follows: The pulley 12 is set in rotation at as steady and uniform a rate as possible, so that the lower end of the spout 7 will be moving in a circle over the separators 6, and a carefully-determined quantity of material equal in amount to the sum of the quantities desired is then introduced in one mass into the bin 3. This material immediately flows from the bin through the spout 5 into the moving spout 7 and falls therefrom in a continuous stream, which is distributed among the spaces between the separators 6 in order, each of the latter acting to separate from each other two consecutive small portions of said stream. By the rotation of the pulley 12 at a sufficient speed the stream of material is thus separated into so many portions that any veriation or fluctuation in its size is divided and distributed among the several spaces between the separators 6, and these small portions or increments received between the separators 6 are thence conducted into the respective receptacles in which the desired quantities of material are thus built up concurrently by the addition of the successive increments thereto until the amount of material placed in the bin 3 has been distributed, so that at the end of the operation each of the receptacles will have received a quantity of material which will be near enough to the required size to satisfy commercial requirements. The results obtained by the operation above described, however, are liable to be affected by certain kinds of errors, the cause of which cannot readily be detected in most cases, and I will now set forth the nature of these errors and the causes from which they may result, together with the means which I have devised for getting rid of them.

It is a principle of frequent application in physical measurements that the errors with which any series of measurements may be affected may be divided into two classes— first, accidental errors, or those which in a large number of measurements will tend to neutralize each other, being as liable to be positive as negative, and, second, systematic errors, or those which, no matter how many measurements are made, do not tend thus to be eliminated, but tend to affect each measurement in the same direction. In the operation of the apparatus above described, assuming that all the relatively small portions separated from the stream of material should theoretically be of the same size and that any departure from such size is an error, the errors due to a slight eccentricity of the series of separators 6, for example, or to a periodic change of speed in the pulley 12 occurring once during each revolution thereof at the same point would be systematic errors, which would tend to affect each series of relatively small portions in the same manner and could never neutralize one another no matter how small or numerous said portions. Therefore in order to eliminate these errors I provide for the independent revolution of both the stream of material and the series of separators and at the same time preserve a relative movement between them which will be sufficient for the purpose of separating the relatively small quantities of material in the manner above set forth, and this may be accomplished by causing the series of separators and the stream of material to revolve at different speeds in the same direction or at the same or different speeds in opposite directions. The result of such construction and operation is that any systematic error due to either of the causes above described or to any similar cause will be made to affect a different receptacle at each revolution of the stream of material, and hence will ultimately affect all of the receptacles alike, so that the systematic errors which would otherwise affect certain receptacles only will thus be distributed among all the resulting quantities proportionately, said errors being, in effect, revolved at a predetermined rate of speed.

In order to provide for the independent revolution of the stream of material and the separators, the vertical rod 9, which carries the series of separators and the table 10, may be mounted to rotate in suitable journal-boxes 15 and provided with a belt-pulley 16, to which power may be applied in the usual manner.

I prefer to revolve the series of separators in the opposite direction to that in which the spout which delivers the stream of material moves, because the actual velocities of the stream and the separators are thereby added together, and a high relative velocity can thus be obtained without making it necessary to give an undesirably great speed to either of said parts, and preferably the series of separators will be revolved a number of times during the division of each total charge in order that these errors may not only be distributed, but averaged, since not only the accidental, but also the systematic errors, will vary with the variations in the size of the stream, so that it is desirable to distribute both kinds of errors within as short a time as possible. The operation of the apparatus will be the same in principle whether the separators travel in the same direction with the stream of material or in the opposite direction, although in the former case the periods of revolution, of course, must not be alike, since if they were all the material would flow into one receptacle, and in practice they should be so different as to produce a relative velocity between the stream and the separators great enough to cause the division of the total quantity of material operated upon into sufficiently small quantities during the operation. When the revolutions are in the same direction and of different periods, the relative velocity of the stream and the separators will be the difference between their separate velocities, and hence will be less than the velocity of either, and such an arrangement will ordinarily be less desirable for that reason, since it will require the driving of the apparatus at a higher rate of speed to obtain equally accurate results.

It is to be understood that my invention is by no means limited to the apparatus herein specifically described, but is applicable to all apparatus operating according to the same principles and capable of being so constructed as to provide for the rotation of both the stream of material and the series of separators.

I claim as my invention—

1. An apparatus for obtaining simultaneously a plurality of quantities of material of desired size, comprising means for delivering a quantity of material in a stream, an annular series of sharp separating edges providing openings or pockets between them, means for rotating said delivering means above said series of edges in such manner as to separate from said stream successive increments of such smallness as to distribute substantial variations in its density or volume, means for simultaneously rotating said series of separators in such manner as to distribute among said openings or pockets systematic inequalities in the size of said increments, and means for conducting the collective increments delivered between each pair of separating edges into a corresponding receptacle.

2. An apparatus for obtaining simultaneously a plurality of quantities of material of desired size, comprising a table adapted to receive and support a plurality of receptacles, an annular series of separators movable with said table and comprising radial knife-edges accurately spaced apart, means for conducting material delivered between each pair of knife-edges into a corresponding receptacle, means for rotating said table and separators around a central vertical axis, means for delivering a stream of material to said separators, and means for rotating said delivering means concentrically with said separators, for the purpose set forth.

3. An apparatus for obtaining simultaneously a plurality of quantities of material of desired size, comprising a hopper, a delivery-spout leading therefrom, means for rotating the lower end of said spout in a horizontal circle, an annular series of radial knife-edges located beneath the path of said spout and accurately spaced apart to form separators, independent means for rotating said series of separators on a vertical axis concentric with the axis of rotation of said spout, means for conducting material delivered between each pair of separators into a corresponding receptacle, and a receptacle-supporting table rotatable with said separators, for the purpose set forth.

In testimony whereof I have hereunto subscribed my name this 29th day of October, 1901.

WILLIAM EMERY NICKERSON.

Witnesses:
E. D. CHADWICK,
JOSEPH T. BRENNAN.